United States Patent [19]

Wood et al.

[11] 4,227,890

[45] Oct. 14, 1980

[54] PROCESS FOR COOLING AND DRYING CHLORINE GAS

[75] Inventors: Joseph L. Wood, Westminster, Md.; Matthew F. Lipworth, Chattanooga, Tenn.

[73] Assignee: Olin Corporation, New Haven, Conn.

[21] Appl. No.: 904,821

[22] Filed: May 11, 1978

[51] Int. Cl.$^2$ .................... B01D 53/02; B01D 53/14
[52] U.S. Cl. .......................................... 55/30; 55/71
[58] Field of Search ...................... 55/30, 71; 423/500; 204/128, 98

[56] References Cited

U.S. PATENT DOCUMENTS

| | | | |
|---|---|---|---|
| 3,201,201 | 8/1965 | Van Dijk et al. | 55/71 |
| 3,283,476 | 11/1966 | Honigh | 55/30 |
| 3,308,606 | 3/1967 | Hagbarth | 55/29 |

OTHER PUBLICATIONS

Kirk Othmer Encyclopedia of Chem. Tech. 2nd Edition, vol. 1 701 (1963) Chlorine Cooling Drying & Liquefaction p. 701.

Primary Examiner—Frank Sever
Attorney, Agent, or Firm—James B. Haglind; Donald F. Clements

[57] ABSTRACT

A process for cooling and drying wet chlorine gas with concentrated sulfuric acid in which in the final drying stage the acid is maintained at a temperature which cools the chlorine gas to its compression temperature.

The process produces a cool, very dry chlorine gas, is energy efficient and permits optimum design of the chlorine compressor to reduce capital expense requirements.

5 Claims, 1 Drawing Figure

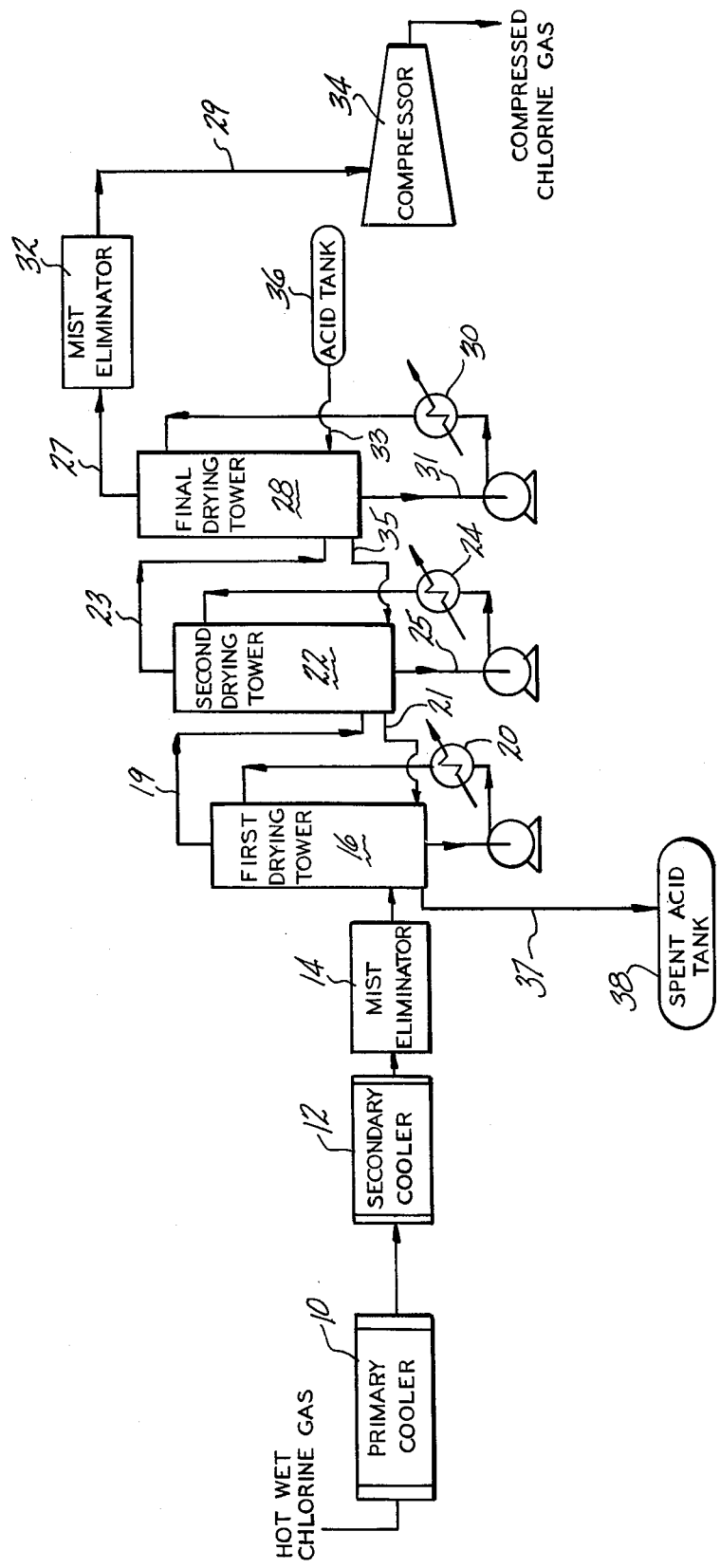

PROCESS FOR COOLING AND DRYING CHLORINE GAS

This invention relates to the drying of gaseous chlorine. More specifically, this invention relates to a process for drying gaseous chlorine with strong sulfuric acid.

To be sold commercially, chlorine gas, as produced by the electrolysis of alkali metal chlorides in electrolytic cells, is usually converted to the liquid form. The gas produced in the cells is both hot and wet and prior to compression and liquefaction is cooled and dried.

Various processes have been developed for drying and cooling chlorine gas, prior to the compression stage, which employ strong sulfuric acid as the drying agent. Many of these processes employ additional cooling agents to reduce the amount of sulfuric acid required. Other processes dry the gas and then apply cooling just before the gas is compressed. Employment of either of these two processes results in considerable expenditures for energy and capital requirements for equipment such as the compressor.

It is an object of the present invention to provide an improved process for cooling and drying chlorine gas prior to its compression.

Another object of the present invention is to provide a process for cooling and drying chlorine gas in which a post-drying cooling stage can be eliminated.

An additional object of the present invention is to provide a process for cooling and drying chlorine gas having reduced costs for processing equipment and electrical energy.

A further object of the present invention is to provide a process for cooling and drying chlorine gas in which the corrosion of processing equipment is minimized.

These and other objects of the present invention are accomplished in an improved process for cooling, drying and compressing wet chlorine gas by contacting the wet chlorine gas with sulfuric acid in at least two drying towers in series, the improvement which comprises maintaining the sulfuric acid in the final drying tower at a temperature which cools the chlorine gas to the temperature at which it will be compressed.

More in detail, the novel process of the present invention is illustrated by the following FIGURE.

In the FIGURE, hot, wet chlorine gas is received from a group of electrolytic cells (not shown) and passed through primary cooler 10, secondary cooler 12 and mist eliminator 14. From mist eliminator 14, the chlorine gas is fed to the lower part of first drying tower 16 where it flows countercurrently through concentrated sulfuric acid to partially dry the gas by removing water. Sulfuric acid is introduced through line 21 from second drying tower 22. A portion of the sulfuric acid flows out the bottom of drying tower 16 and passes through heat exchanger 20 and is returned to the top portion of drying tower 16. Another portion of the sulfuric acid flows from the bottom of the first drying tower 16 through line 37 into weak acid receiver 38. Partially dried $Cl_2$ gas leaves the top of drying tower 16 and is fed through line 19 to the lower part of second drying tower 22. Contact with countercurrently flowing concentrated sulfuric acid in second drying tower 22 further dries the $Cl_2$ gas which exits from the top through line 23. A portion of the sulfuric acid is removed from the bottom of second drying tower 22 through line 25, passed through heat exchanger 24 and recirculated to the top of second drying tower 22 for contacting and drying chlorine gas. Another portion of the sulfuric acid flows from the bottom of second drying tower 22 through line 21 to first drying tower 16. Additional sulfuric acid is supplied to second drying tower 22 from final drying tower 28 via line 35. Within final drying tower 28, the chlorine gas flows countercurrently to concentrated sulfuric acid which has been fed to the top of final drying tower 28 after being cooled by heat exchanger 30. The cooled, dried chlorine gas leaves the top of final drying tower 28, passes through line 27 to mist eliminator 32, and enters compressor 34 through line 29 at the temperature at which it is to be compressed. A portion of the cooled acid from final tower 28 flows directly to second drying tower 22 through line 35. Fresh sulfuric acid, at ambient temperatures, is supplied by tank 36 to final drying tower 28 through line 33.

In the improved process of the present invention, wet chlorine gas is produced in electrolytic chlorine cells of either the mercury or diaphragm type. The wet gas, at a temperature of about 90° C., is cooled to a temperature of from about 90° to about 16° C. and passed through a mist eliminator. Chlorine gas leaving the mist eliminator to enter the drying towers has a moisture content of greater than about 4,000 parts per million of $H_2O$ by weight.

At least two towers are used in the process of the present invention to cool and dry the moist chlorine gas. Any tower may be employed which provides adequate contact between the chlorine gas and the sulfuric acid used as the cooling and drying agent. Suitable towers include packed towers, spray towers, absorption towers and the like. An inventory of sulfuric acid is maintained in each of the towers sufficient to provide a circulating rate through the tower to maintain intimate contact between the sulfuric acid and the chlorine gas. The amount of fresh acid fed to the final drying tower and the subsequent withdrawal of weak acid from the first drying tower is very small (less than 0.5 percent by volume) in comparison with the acid inventory.

Where the chlorine gas is dried in two drying towers, wet chlorine gas is passed into the first drying tower to contact relatively concentrated sulfuric acid, that is, acid at a concentration of from about 85 to about 90 percent by weight of $H_2SO_4$. Up to about 80 percent of the moisture is removed from the wet chlorine gas by the acid and upon dilution of the acid, the heat released raises the temperature of the acid. Over 99 percent by volume of this diluted acid, now at a concentration of about 70 percent by weight of $H_2SO_4$, is passed through a heat exchanger where it is cooled by water to the acid temperature desired. The cooled, reconcentrated acid is recirculated to the first drying tower. Another portion of the diluted acid is fed to a weak acid receiver where it is suitably disposed of, for example, by sale for use in the production of fertilizers.

To the final drying tower, fresh sulfuric acid, at a concentration of from about 93 to about 98 percent by weight of $H_2SO_4$, is fed at ambient temperature. The acid held in the final drying tower is continually withdrawn and circulated through a heat exchanger and returned to the final drying tower. In this heat exchanger, the acid is cooled at about 12° to about 16° C. by means of chilled water. Chlorine gas leaving this final tower has a moisture content of less than about 10 parts per million by weight and is at the temperature desired for drawing the gas into the compressors, that is, in the range of from about 12° to about 16° C.

Where additional intermediate drying towers are used between the first drying tower and the final drying tower, the intermediate drying towers also employ sulfuric acid for drying the chlorine gas. Substantially dry chlorine gas, having less than 100 parts per million by weight of water, is produced in the intermediate drying towers and is fed to the final drying tower.

The drying towers are operated in series as shown on the FIGURE. In the drying towers, the chlorine gas is preferably passed countercurrently through the sulfuric acid.

It may be desirable to pass the cooled, dried chlorine gas through a mist eliminator to remove any sulfuric acid mist present prior to compressing the $Cl_2$.

The cooled, very dry, dense gas produced by the novel process of the present invention is obtained with a minimal expenditure of energy. As no further cooling is required, the process permits, for a given rate of chlorine production, the compressor to be designed at the optimum size and thus to reduce the capital expense required. Avoided by the present process is the need for pre-compression cooling of the chlorine gas by separate heat exchangers or by direct contact with liquid chlorine.

The novel process of the present invention is further illustrated by the following EXAMPLE without any intention of being limited thereby.

EXAMPLE

Wet chlorine gas produced in a group of electrolytic cells is passed through a primary cooler and a secondary cooler and then through a mist eliminator. Fed to a first drying tower at the rate of 9,000 cubic feet per minute, the gas was at a temperature of 15.6° C. and contained 95 percent by volume of $Cl_2$ and about 4,800 parts per million by weight of water. Sulfuric acid (87 percent by weight of $H_2SO_4$) at a temperature of 37.8° C. was introduced into the first drying tower from the second drying tower countercurrently to the gas flow. Following the first stage drying, the gas, at a temperature of 37.8° C. and having a water content of about 980 parts per million, was fed to a second drying tower. Spent sulfuric acid was removed at the bottom of the first drying tower at a concentration of 70 percent by weight of $H_2SO_4$ and a temperature of 39.2° C. A portion of this spent acid was passed through a heat exchanger, cooled by plant cooling water and recirculated to the first drying tower at a temperature of 37.8° C. A second portion of the spent acid was passed from the first drying tower into a spent acid receiver. In the second drying tower, concentrated $H_2SO_4$ (92 percent by weight of $H_2SO_4$) at a temperature of 37.8° C. was similarly passed countercurrently to the gas flow. Upon exiting from the second drying tower, the gas had a water content of about 22 parts per million by weight and was fed to a third drying tower. Sulfuric acid (93 percent by weight of $H_2SO_4$) at ambient temperature was introduced to the acid inventory in the third drying tower. This acid inventory was circulated through a plate heat exchanger. Chilled water at a temperature of 4.4° C. was also circulated through the heat exchanger. The circulation rates for the $H_2SO_4$ and chilled water were maintained to cool the $H_2SO_4$ to a temperature of 12.8° C. while increasing the water temperature to 10° C. The cooled $H_2SO_4$ was fed to the third drying tower where it cooled the chlorine gas to a temperature of 15.6° C. while reducing the water content to less than 10 parts per million. Dried $Cl_2$ gas was passed from the third drying tower to a mist eliminator and then introduced directly into a compressor.

WHAT IS CLAIMED IS:

1. A process for cooling and drying wet chlorine gas by contacting said wet gas with sulfuric acid in at least two drying towers in series which comprises the steps of:
   (a) feeding wet chlorine gas to a first drying tower,
   (b) contacting in said first drying tower said wet chlorine gas with sulfuric acid to remove water and produce a partially dry chlorine gas,
   (c) feeding said partially dry chlorine gas to the final drying tower,
   (d) contacting in said final drying tower said partially dry chlorine gas with concentrated sulfuric acid to produce a dry chlorine gas containing less than about 10 parts per million by weight of water, having a temperature of from about 12° to about 16° C., and
   (e) feeding said cool, dry chlorine gas to a compressor without intermediate cooling between steps (d) and (e).

2. The process of claim 1 in which said wet chlorine gas contains greater than about 4,000 parts per million by weight of water.

3. The process of claim 2 in which said sulfuric acid fed to said first drying tower is at a concentration of from about 85 to about 90 percent by weight of $H_2SO_4$.

4. The process of claim 2 in which prior to step c, said partially dry chlorine gas is fed to an intermediate drying tower to contact said partially dry chlorine gas with sulfuric acid to produce a substantially dry chlorine gas containing less than about 100 parts per million by weight of water.

5. The process of claims 3 or 4 in which said concentrated sulfuric acid has a concentration of from about 93 to about 98 percent by weight of $H_2SO_4$ and is at a temperature of from about 12° to about 16° C.

* * * * *